Patented Jan. 10, 1939

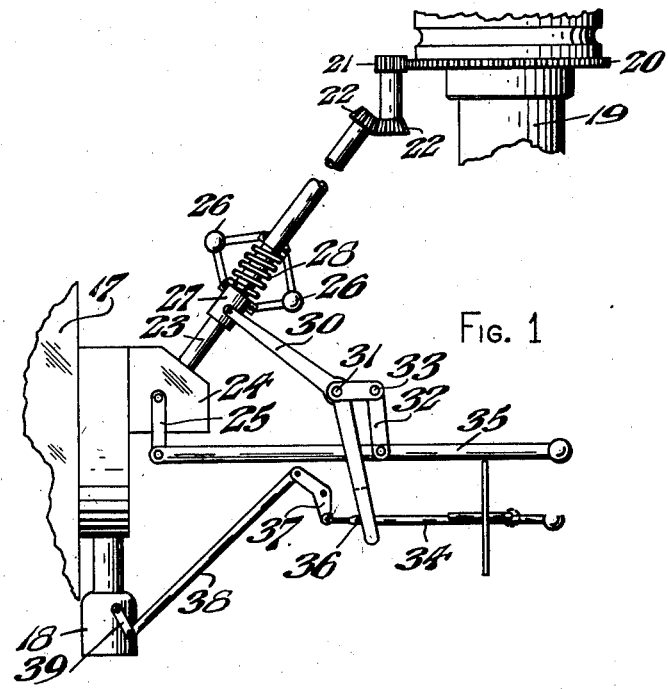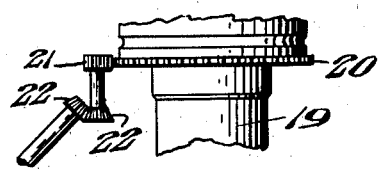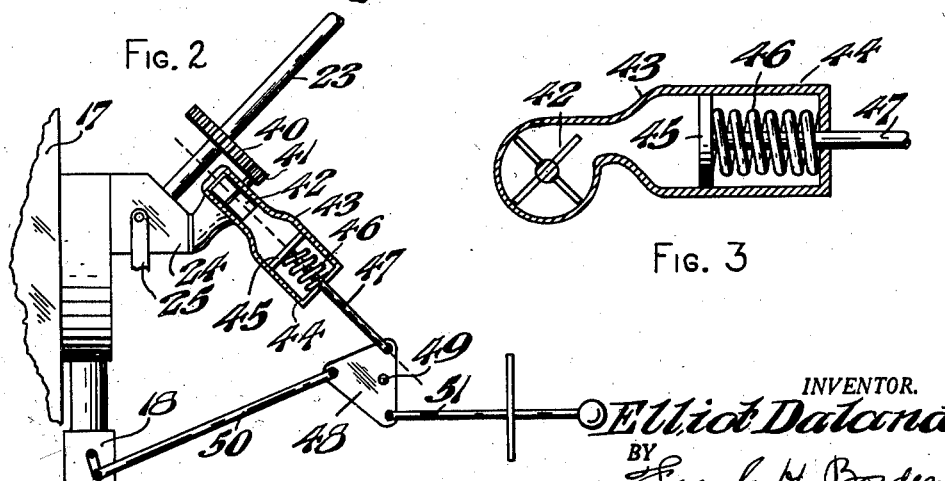

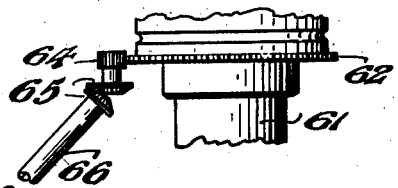
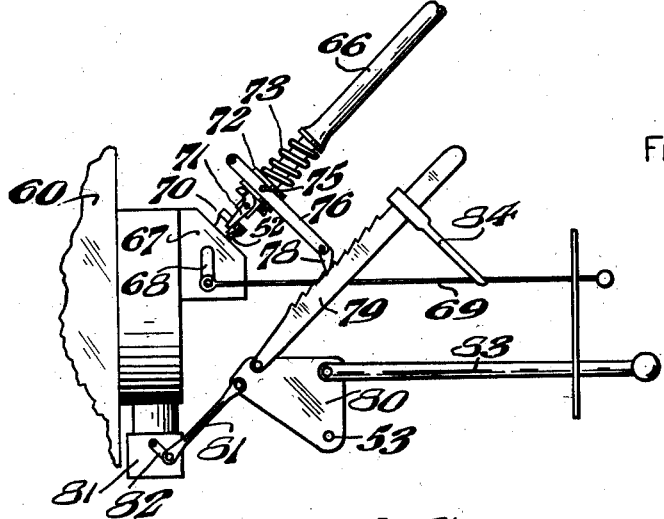
Fig. 4
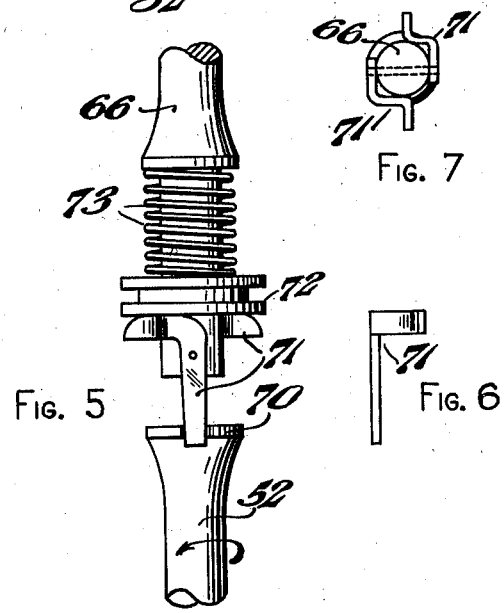
Fig. 5  Fig. 6  Fig. 7
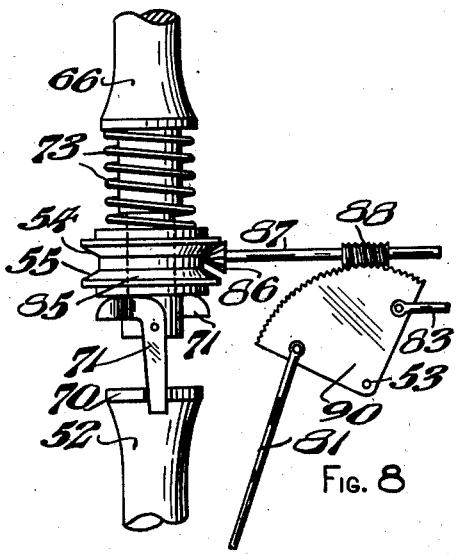
Fig. 8
INVENTOR.
Elliot Daland
BY Frank H. Borden
ATTORNEYS.

2,143,688

UNITED STATES PATENT OFFICE 2,143,688

GYROPLANE ROTOR STARTER

Elliot Daland, Philadelphia, Pa., assignor to Edward Burke Wilford, Philadelphia, Pa.

Application April 3, 1936, Serial No. 72,481

1 Claim. (Cl. 244—18)

This invention relates to the starting mechanism used to impart the initial rotative speed to the rotors of rotary wing aircraft and more particularly to the starting of normally aerodynamically rotated rotors, as for instance, those used on gyroplanes. However, the scope of this invention is not limited to starting only but contemplates the use of the various drives shown for transmitting small amounts of power from the engine to the rotor at any time or all of the time. It is assumed in all the disclosures that there is an engine which supplies at least a portion of its power to the starting system, and a rotor which supports a substantial amount of the weight of the craft, and that these are essential parts of a complete aircraft which are not shown because its form is in no way a part of this invention.

In the past the rotors of rotary wing aircraft have been started by a simple clutch, shafting and bevel gears, and the maximum torque in the system was limited by the slipping of a clutch or the shearing of a pin.

The load of starting a rotor consists at first entirely of inertia of the mass of the rotor, but as the speed increases aerodynamic drag begins to be an appreciable part of the load. At the end of the starting period the load consists almost entirely of drag and the inertia is inconsiderable. Since the weight of the parts must be kept as small as possible, it is necessary to determine the torque required and design all the shafts, gears, and their mountings to stand only that required torque. Then in order to obtain the quickest start it is necessary to maintain that maximum torque for as long a period as possible. This last function is one of the objects of the present invention.

Another object is the disconnection of the drive automatically when the rotor is driven by the air faster than the engine can drive it. This was accomplished in the past by a roller clutch on some such ratchet drive which was usually placed in the shaft between the engine and the pinion gear. Thus when autorotating the rotor was obliged to turn the pinion and some shafting which caused a small amount of friction on the freedom of the rotor.

In the present invention this friction is eliminated and other objects gained as will be understood and appreciated by any one skilled in the art by reference to the drawings in connection with the following descriptive matter in the accompanying drawings, forming part of this invention.

Fig. 1 is a diagrammatic side view of a mechanical device for controlling the throttle proportionally with the speed of the rotor.

Fig. 2 is a diagrammatic side view of a pneumatic device for control of the throttle by the speed of the rotor.

Fig. 3 is an enlarged fragmentary transverse section taken thru line AA of Fig. 2.

Fig. 4 is a diagrammatic side view of a mechanical method of opening the throttle to produce constant torque on the rotor regardless of speed.

Fig. 5 is an enlarged fragmentary side elevational view of the torque measuring device used in the device of Fig. 4.

Fig. 6 is a view at right angles to Fig. 5, of one of the torque measuring levers.

Fig. 7 is an end view of the two levers and shaft shown in Fig. 5.

Fig. 8 is a diagrammatic fragmentary side elevational view of a servo mechanism which both opens and shuts the throttle to obtain constant torque.

Figure 9:
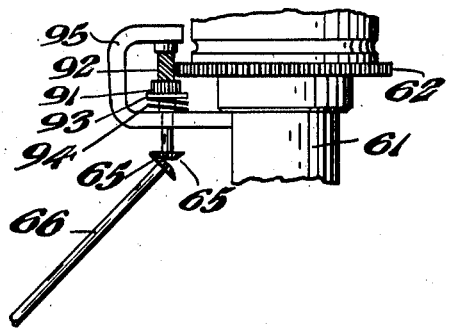
Fig. 9 is a fragmentary side view of a device for disengaging the starter drive when rotor is turning faster than the engine can drive it. This device moves the gear axially, similarly to the so-called "Bendix" drive.

Referring to Fig. 1, the numeral 17 represents the rear part of the engine, 18 the carburetor, 19 the rotor hub. 20 is a large gear attached to the hub 19, 21 represents the starting pinion, 22 is a pair of bevel gears in train with the pinion gear 21 and ring gear 20. These bevel gears 22 may be eliminated by making gears 20 and 21 beveled. A shaft 23 which is driven by a clutch 24, engages bevel gears 22. The clutch 24 may be mounted on the back of the engine 17 and is operated by lever 25 and push rod 35 which is shown in the engaged position.

Attached to starter shaft 23 by suitable links are the weights 26 which move the collar 27 axially against spring 28 as the speed increases. Collar 27 actuates the upper end of bellcrank 30 up and down along the shaft 23. Bellcrank 30 is attached by pin 31 to another bellcrank 32 which revolves about a fixed pin 33, and whose lower arm is attached to clutch rod 35. The lower arm of bellcrank 30 strikes against a pin 36 on throttle rod 34. This rod 34 actuates bellcrank 37 which moves rod 38 and thus operates the throttle lever 39 of the carburetor 18.

The operation is as follows: With clutch engaged (shown in Fig. 1) the lower end of bellcrank 30 engages pin 36, and as speed increases, collar 27 rises, pushing pin 36 forward and opening the throttle. When rotor is up to speed, clutch is disengaged, i. e., pushed forward, which rotates bellcrank 32 and raises pin 31 and bellcrank 30 so that its lower end no longer engages the pin 36, then the throttle is free to use as a hand throttle for controlling the engine in flight. The throttle is closed before the clutch is engaged again for starting. For a constant torque, the power should vary as the speed, thus by proper design of length of arms and linkage, the system can be constructed to a give a very close aproximation to constant torque throughout the entire starting period.

Referring to Fig. 2, the same result is obtained as in Fig. 1, but by a different structure and method. As in Fig. 1, numeral 17 represents the rear of the engine, 18 the carburetor, 19 the rotor hub. 20 is a large gear, 21 a pinion engaging gear 20, 22 a pair of bevel gears driving pinion 21. 23 is a shaft driving gears 22, thru clutch 24, operated by lever 25. Mounted on the shaft 23 is gear 40 driving pinion 41 at fairly high speed. This pinion 41 drives the impeller 42, (Figs. 2 and 3) of a centrifugal blower, the casing 43 of which is connected to a cylinder 44 in which is a free moving piston 45, acting against a spring 46, and which is attached to rod 47. The rod 47 is attached to bellcrank 48, rotating on fixed pin 49 and attached to bellcrank 48 are rods 51 attached to the other handle or control, and rod 50 attached to carburetor throttle arm 39.

The operation is as follows: As the speed of the rotor increases, the blower 42 revolves faster and exerts more pressure on piston 45 which moves down against the spring and opens the throttle. When the rotor is up to speed the throwing out of the clutch could be arranged to disconnect rod 47 from bellcrank 48 and thus the regular hand throttle could be used in flight. By properly proportioning the length of arms, stiffness of spring, and linkages, this system could be made to open the throttle at such a rate that the torque on the rotor would be very nearly constant throughout the starting period.

Referring to Fig. 4, the rear end of the engine is represented by 60. This may or may not be the engine which propels the aircraft. The hub 61, of the rotary wing system, has a ring gear 62, in which is engaged a pinion 64, driven by bevel gears 65 thru shaft 66. This is driven thru a torque metering device shown in Figs. 5 to 7 inclusive, by the clutch 67 operated by the lever 68 and a rod 69. Referring now to Fig. 5, flange 70 is carried by a rod 52, driven by the clutch 67. It has a number of notches (2 shown) engaging an equal number of torque levers 71. These levers may be offset as is shown in Figs. 6 and 7, so that the upper end extends radially from the shaft. These levers 71 all bear on a collar 72 slideable on the shaft 66, and collar 72 is held down by a spring 73. The collar 72 has a groove which engages pin 75 on lever 76 which is fixed at pin 77.

On the free end of lever 76 is the pawl 78, engaging ratchet teeth in the bar or ratch 79, which is pinned to the bellcrank 80. This bellcrank 80, is pivotally mounted at 53 and is part of the hand throttle operating system, since attached to one arm is the rod 81, which operates the carburetor throttle lever 82, and to another arm is attached the rod 83 which is operated by the pilot's hand.

The member 84 connects the bar 79 with the clutch rod 69 in such a way that when the clutch is disengaged, the bar 79 is pulled out of contact with the pawl 78. The operation is as follows: With the engine idling and throttle closed the clutch is engaged. This puts bar 79 in contact with pawl 78. A torque load is applied to flange 70 in the direction of the arrow (Fig. 5). This causes levers 71 to push up on collar 72, compressing spring 73 and causing pawl 78 to move up along bar 79. The rotor starts to turn and in a short time the rotor has acquired sufficient speed so that the torque with the initial low throttle setting, falls off, then the spring expands and pawl 78 catches bar 79 and moves it down until the rotor has absorbed this extra torque. The throttle is opened a little as soon as the torque falls below a set amount and stays in that position until the rotor speed increases and the torque falls off again.

This is a device for proportioning the throttle opening accurately to torque regardless of speed. In this pawl and ratchet device there is necessarily some slight variation in torque. This can be made quite small by having fine teeth on the ratchet and a dampening device to prevent oscillation (not shown). A much smoother opening can be obtained by the alternate device shown in Fig. 8. Here everything is the same as in Figs. 4, 5, 6 and 7 up to the collar 85 which (in place of a groove) has a V slot, having upper and lower friction surfaces 54 and 55, in which a conical roller 86 of friction material is held approximately in a fixed position by shaft 87 and bearings (not shown). This beveled roller 86 drives a worm gear 88 which engages a segment of gear which is attached to or forms part of the bellcrank 90. This replaces bellcrank 80 in Fig. 4, and rods 81 and 83 perform the same functions.

The operation of the modification shown in Fig. 8 is as follows: An increase in torque raises the collar 85 and lower side 55 of V slot engages lower side of conical roller; this spins roller and turns the worm which tends to close the throttle. At the start the throttle is against a stop so that nothing happens except slippage of the roller. In a moment the torque falls, then collar 85 moves down until the other side of slot 54 engages roller 86 and causes it to spin in the opposite direction and the worm then opens the throttle. The instant the torque exceeds the required amount collar 85 raises a little and roller 86 slips and stops turning until speed of rotor has picked up and torque fallen off. It then starts turning again opening the throttle more and more as the speed increases.

These two devices (Figs. 4 and 8) protect the clutch, shafting and gears from any excessive torque so they can be designed very closely and operated near this limiting stress. They also insure the torque always being the maximum that the starter will stand and so insure the quickest possible start.

Referring to Fig. 9, the hub 61 of the rotary wing system is provided with a ring gear 62 fixed to it. The pinion 91 is screwed on to the steep pitch screw thread 92, which may be a double or triple thread and this thread 92, forms a part of the mounting shaft of the pinion 91. A slight amount of friction is supplied to the pinion by the spring 94 which prevents it from revolving, when the shaft 92 is turned.

The pinion 91 advances upward and its teeth mesh with the teeth of the ring gear 62. It continues to advance until it is stopped by collar 93, fixed to its shaft 92, which holds pinion 91 in proper relation to gear 62. The starting of the rotor is then effected, but as soon as the air from the take-off urges the rotor to turn faster than the engine wants to turn it, then the gear 62 screws the pinion 91 down on its shaft until it comes out of mesh and the rotor is then perfectly free to turn without the friction of any gears or shafts to impede it. The screwed shaft 93 may be mounted in 2 bearings with a support 95, or it may be made cantilever from one long bearing. The screwed shaft 91 may be driven by bevel gears 65 and shaft 66 from the engine (not shown) as in previous figures in this disclosure, notably Fig. 4. This method of drive may be used in connection with any of the preceding methods of governing.

Figure 10:
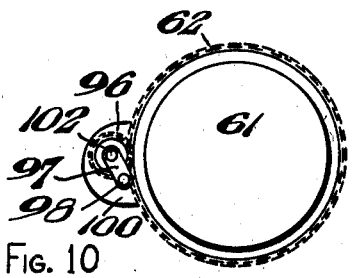
Figs. 10, 11 and 12 are respectively top, fragmentary, side and bottom views of a device for moving the starter pinion radially in and out of engagement with the rotor gears.
Figure 11:
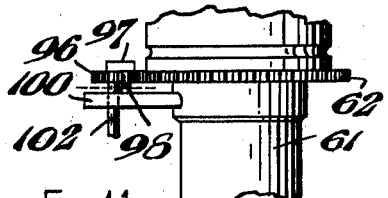
Figure 12:
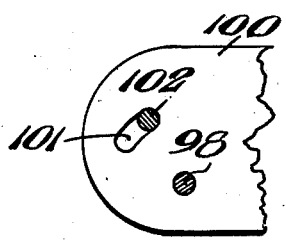

Another method of automatic connection of the drive is shown in Figs. 10, 11 and 12. Here 61 represents the hub of the rotary wing system, 62 a ring gear fixed to the rotating part of the hub 61, and a pinion gear 96 driven thru shaft 102 from the engine (not shown) is mounted on link 97 which is pivoted on the fixed pin 98. Pin 98 is carried by the bracket 100 attached to the fixed part of the hub. The motion of the pinion 96 and link 97 about pin 98 is limited by a slot 101 in bracket 100 so that in the meshed position proper clearance is maintained between the teeth and in the unmeshed position, the gear 62 revolves just clear of the teeth of pinion 96.

Figure 13:
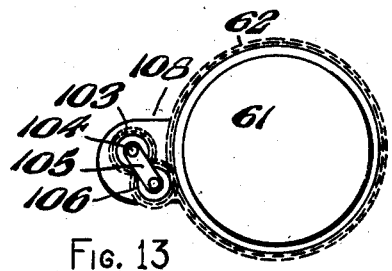
Figs. 13, 14 and 15 are respectively top, fragmentary side and bottom views of a modified drive for running a radial disengagement of an extra gear, which allows the starter shaft to stay in the same location.
Figure 14:
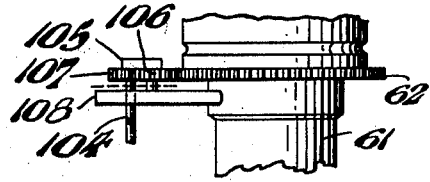
Figure 15:
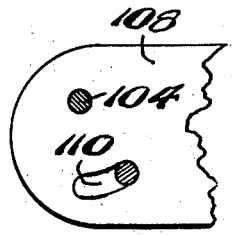

The action is as follows: Rotation in a counterclockwise direction of pinion 96, assuming a small friction between pinion 96 and link 97, turns link 97 clockwise until teeth are engaged and the driving force which is upward in Fig. 10 holds pinion 97 in mesh with gear 62. As soon as the air drives the hub and gear 62 faster than the engine wants to drive it, then the direction of this force changes to downward in Fig. 10 and the link 97 and the pinion is forced out of engagement with gear 62 and it turns perfectly freely. This is a very simple and direct way of disengaging the drive automatically but it involves moving the drive shaft 102 sideways a small amount which could be allowed for by universals in the shaft. However, in case it were desired to hold the drive shaft still, a modification is shown in Figs. 13, 14 and 15 which accomplishes this. The hub 61 of the rotating wing system has attached to its rotating portion a ring gear 62. The pinion gear 103 is driven from the engine by shaft 104 and remains fixed in position. Meshing with drive gear 103 is the idler gear 106, carried by link 105 which link is fixed and swings about shaft 104. Motion of link 105 and gear 106 about shaft 104 is limited, as by allowing the shaft 107 to strike the ends of slot 110 in the main supporting bracket 108. In the meshed or right hand position of the gear 106, the stop allows just the proper clearance for the meshed teeth. In the free or left hand position of gear 106, its teeth are just clear of the teeth of gear 62. The action is as follows:

Counterclockwise rotation of the driven pinion 103, assuming a slight friction between shaft 104 and link 105, causes link 105 to turn counterclockwise. This meshes the teeth of idler pinion 106 with gear 62 and drives 62 in a counterclockwise direction. The driving force on 106 is upward in Fig. 13, which holds the pinion 106 in mesh with gear 62, but as soon as the air drives 62 faster than the engine wants it to drive it, the direction of the driving tangential force is reversed and is downward in Fig. 13. This causes pinion 106 to move out of mesh with gear 62, and 62 can spin freely under the action of the air.

It is to be observed that the limitation of torque by means of a slipping clutch as proposed heretofore and as used in other arts, is not as desirable as the present method of limiting torque for the following reasons: first, in aircraft, all the machine parts must be designed as small and light as possible and in order to limit the torque by slipping a clutch, power has to be absorbed by the frictional slippage which generates heat. In order to dissipate this heat the clutch has to be of large size and of large heat capacity which runs up the weight and dimensions of the clutch beyond that which is feasible for aircraft. Second, due to the slippage of the clutch, abrasion is bound to occur, which requires frequent renewal of the parts. Third, that it is inefficient from the standpoint of fuel efficiency and wear and tear on the engine. All of these disadvantages are obviated by the invention herein.

I claim:

In rotary wing aircraft, a motor for forward propulsion having a throttle, a rotor, a drive from said motor to said rotor for starting rotation of the rotor, a blower operatively associated with the rotor in driven relation which produces air pressure varying with the speed of the rotor, a cylinder and piston operatively associated with the blower, which is acted on by said air pressure and arranged to open the throttle of the motor as the rotor speed increases so as to provide a substantially uniform torque to the rotor while it is being started.

ELLIOT DALAND.